Patented Nov. 26, 1940

2,222,733

UNITED STATES PATENT OFFICE 2,222,733

ACYL DERIVATIVES OF AZO DYESTUFFS AND PROCESS OF PRODUCING SAME

Franz Ackermann, Binningen, Switzerland, assignor to the firm Society of Chemical Industry in Basle, Basel, Switzerland No Drawing. Application June 30, 1939, Serial No. 282,326. In Switzerland July 2, 1938

2 Claims. (Cl. 260—204)

It has been described in application Serial No. 92,244, filed July 23, 1936, that water-insoluble azo dyestuffs which contain hydroxyl groups, but are free from carboxyl groups and sulfonic groups, can be converted into water-soluble preparations by treating them in the presence of a tertiary base such as pyridine with acylating agents selected from the group consisting of halides of organic acids which contain more than one salt-forming group selected itself from the group consisting of carboxyl groups and sulfonic groups. Products of this kind have been cited in great number in the above mentioned application Serial No. 92,244, filed July 23, 1936, for instance the chlorides or bromides of sulfobenzoic acids, of benzene disulfonic acid, of sulfonaphthoic acids, of furane-sulfocarboxylic acid, of sulfoacetic acid and the like.

The ester-like derivatives of dyestuffs thus obtained are characterized, on the one hand, by their solubility in water and, on the other hand, by the valuable property of regenerating the parent dyestuff under the influence of mild saponifying agents. This property renders them very valuable for producing fast dyeings, especially for producing fast prints on various substances.

It has now been found that particularly valuable preparations of the kind described above can be obtained by acidylating according to the process of application Serial No. 92,244, filed July 23, 1936, those water-insoluble azo dyestuffs which are formed by causing diazotized urethanes of the general formula

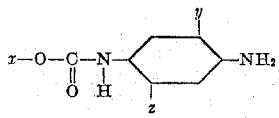

wherein $x$ stands for alkyl, $y$ and $z$ stand for members of the group consisting of hydrogen, halogen, $CH_3$ and alkoxy, which urethanes may be produced according to the data of U. S. A. Patents Nos. 2,026,618 and 2,026,619, to react with arylamides of aromatic ortho-hydroxy-carboxylic acids which couple in ortho-position to the hydroxyl group, particularly arylamides from the 2:3-hydroxy-naphthoic acid and primary amines of the benzene and of the naphthalene series. Such dyestuffs have been cited in great number in U. S. A. Patent No. 2,040,473, further in British Patents Nos. 459,894 and 453,513, in German Patent No. 653,116 and in French Patent No. 801,899. For simplicity's sake reference is made to these patents.

The new products are acyl derivatives of the azo dyestuffs of the general formula

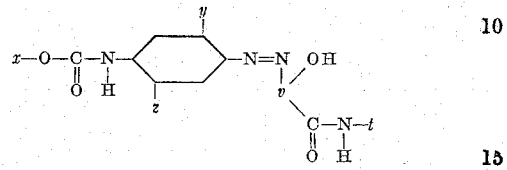

wherein $x$ stands for alkyl, $y$ and $z$ stand for members of the group consisting of hydrogen, halogen, $CH_3$ and alkoxy, $v$ stands for the aromatic nucleus of an aromatic ortho-hydroxycarboxylic acid, and $t$ stands for the radical of a primary aromatic amine selected from the group consisting of aromatic amines of the benzene and of the naphthalene series, in which the hydrogen atom of the OH group and at least one of the hydrogen atoms of the two

are replaced by the acyl radical of a sulfocarboxylic acid, which acyl radicals are united to the azo dyestuff radical by their

which acyl derivatives of azo dyestuffs in the form of their alkali salts are dark powders, soluble in water to red-brown to brown solutions from which the insoluble dyestuff of the formula

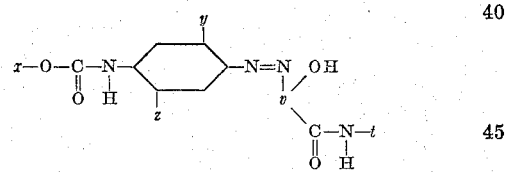

is precipitated by heating with alkalies.

These products have the advantage over the comparable ester-like products from dyestuffs obtained from diazotized 1-amino-4-benzoyl-amino- or 4-phenoxyacetylamino-benzenes cited in application Serial No. 92,244, filed July 23, 1936, that they are better suited for producing prints on vegetable fibers or on fibers consisting of natural or regenerated cellulose.

The following example illustrates the invention, without however limiting the same:

27.1 parts of the product obtained by coupling diazotized 1-amino-2:5-diethoxy-4-aminocarbethoxy-benzene with 2:3 hydroxy-naphthoic acid anilide are stirred with 150 parts of pyridine at 50–55° C. 33 parts of the melted benzoyl-chloride-meta-sulfonic acid or of the 3-sulfochloride of the benzoic acid are poured into this solution while allowing the temperature to rise. Stirring is then continued for some time at 110–115° C. As soon as a clear brown solution is obtained of which a sample is clearly soluble in water, the mixture is cooled to 50° C. and a part of the pyridine is distilled in a vacuum. The residue is dissolved in warm water, the remaining pyridine is united with acid, for example aqueous hydrochloric acid, and the condensation product is salted out, for instance with sodium chloride. It is then filtered and the residue is washed with an aqueous sodium chloride solution as free from pyridine salts as possible. The pyridine salts may also be removed by dissolving the residue once or twice in water and reprecipitating it with sodium chloride solution. After drying there is obtained a dark colored powder which dissolves in water to a brown solution. The parent pigment may be easily regenerated after addition of substances having an alkaline reaction.

When printing acocrding to the methods described for example in U. S. A. Patent No. 2,095,600 there are obtained beautiful fast blue tints.

The procedure is similar with the dyestuffs of U. S. A. Patent No. 2,040,473, of German Patent No. 653,116 and of French Patent No. 801,899.

The following table gives information on the characteristic properties of the new acylation products:

| | Coupling component | Diazotizing component $x-O-C(=O)-N(H)-\underset{z}{\underset{|}{\overset{y}{\overset{|}{\bigcirc}}}}-NH_2$ | | Acylating agent | Color of the aqueous solution of the sodium salt of the acylation product | Shade of dyestuff saponified on the fiber |
|---|---|---|---|---|---|---|
| 1 | p-Chloranilide of the 2:3-hydroxy-naphthoic acid. | $x=C_2H_5$ | $y$ and $z=OC_2H_5$ | Chloride of the benzoic-3-sulfonic acid. | Brown | Blue. |
| 2 | p-Anisidide of the 2:3-hydroxy-naphthoic acid. | $x=CH_3$ | $y$ and $z=OC_2H_5$ | Bromide of the benzoic-3-sulfonic acid | do | Do. |
| 3 | o-Anisidide of the 2:3-hydroxy-naphthoic acid. | $x=CH_3$ | $y$ and $z=OC_2H_5$ | Dichloride of the benzoic-3-sulfonic acid. | do | Do. |
| 4 | do | $x=CH_3$ | $y$ and $z=OCH_3$ | Chloride of the furane sulfocarboxylic acid. | do | Violet. |
| 5 | β-Naphthylamide of the 2:3-hydroxy-naphthoic acid. | $x=C_2H_5$ | $y$ and $z=OCH_3$ | Chloride of the benzoic-3-sulfonic acid. | do | Do. |
| 6 | Anilide of the 2:3-hydroxy-naphthoic acid. | $x=CH_3$ | $y$ and $z=CH_3$ | do | Red-brown | Bordeaux. |
| 7 | do | $x=C_2H_5$, $y=OCH_3$, $z=CH_3$ | | do | do | Garnet. |
| 8 | do | $x=C_2H_5$ | $y$ and $z=Cl$ | do | do | Red. |
| 9 | do | $x=CH_3$, $z=H$ | $y=OCH_3$ | do | do | Bordeaux. |
| 10 | do | $x=C_2H_5$, $y=Cl$, $z=OCH_3$ | | do | Brown | Currant. |
| 11 | α-Naphthylamide of the 2:3-hydroxy-naphthoic acid. | $x=C_2H_5$ | $y$ and $z=OC_2H_5$ | Benzoylchloride-3:5-disulfonic acid. | do | Blue. |
| 12 | Anilide of the 2:3-hydroxy-anthracenecarboxylicacid. | $x=C_2H_5$ | $y$ and $z=OC_2H_5$ | Benzoic acid-3:5-disulfochloride. | do | Green. |
| 13 | p-Anisidide of the hydroxy-1-naphtho-carbazole-6-carboxylic acid. | $x=C_2H_5$ | $y$ and $z=OC_2H_5$ | do | do | Black. |
| 14 | Anilide of the 2:3-hydroxy-naphthoic acid. | $x=C_4H_9$ | $y$ and $z=OC_2H_5$ | Chloride of the benzoic-3-sulfonic acid. | do | Blue. |
| 15 | do | $x=C_5H_{11}$ | $y$ and $z=OC_2H_5$ | do | do | Do. |

What I claim is:

1. The acyl derivatives of the azo dyestuffs of the general formula

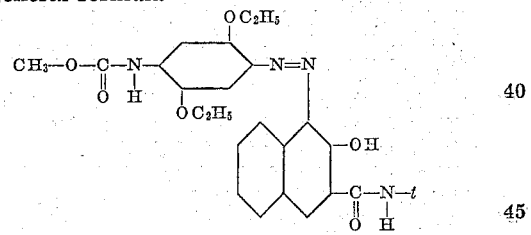

wherein $t$ stands for the radical of a primary aromatic amine selected from the group consisting of aromatic amines of the benzene and of the naphthalene series, in which the hydrogen atom of the OH-group and at least one of the hydrogen atoms of the two

are replaced by the acyl radical of the benzoic-3-sulfonic acid, which acyl radical is united to the azo dyestuff radical by its

which acyl derivatives of azo dyestuffs in the form of their alkali salts are dark powders, soluble in water to brown solutions from which the insoluble dyestuff of the formula

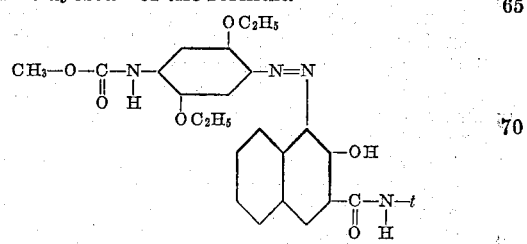

is precipitated by heating with caustic alkalies.

2. Process for the manufacture of derivatives of dyestuffs containing at least one hydroxyl group, comprising causing dyestuffs free from carboxyl groups and from sulfonic groups obtained from diazotized urethanes of the general formula

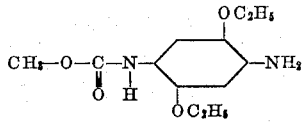

and arylides from 2:3-hydroxynaphthoic acid and primary aromatic amines selected from the group consisting of aromatic amines of the benzene and of the naphthalene series, to react in presence of pyridine with a chloride of a sulfobenzoic acid.

FRANZ ACKERMANN.